United States Patent [19]
Lorriette

[11] Patent Number: 5,875,680
[45] Date of Patent: Mar. 2, 1999

[54] AUTOMATIC FORWARD/REVERSE GEAR CHANGE SYSTEM HAVING A MAIN CLUTCH DISENGAGED AND MAIN VEHICLE BRAKE ENGAGED DURING A SHUTTLE SHIFT

[75] Inventor: Patrick Lorriette, Clermont, France

[73] Assignee: AGCO SA, Beauvais, France

[21] Appl. No.: 900,614

[22] Filed: Jul. 25, 1997

[30] Foreign Application Priority Data

Jul. 26, 1996 [GB] United Kingdom .................... 9615793

[51] Int. Cl.⁶ ............................ F16H 17/00; B60K 41/20
[52] U.S. Cl. ................................ 74/335; 477/92; 192/219
[58] Field of Search ................................ 74/335, 336 R; 477/70, 92, 74, 95, 96, 183, 199; 192/215, 216, 218, 219

[56] References Cited

U.S. PATENT DOCUMENTS

| | | | |
|---|---|---|---|
| 3,543,891 | 12/1970 | Mathers | 477/92 |
| 3,548,980 | 12/1970 | Schmidt et al. | 477/94 X |
| 3,669,234 | 6/1972 | Mathers | 477/92 |
| 3,876,033 | 4/1975 | Shore | 477/92 X |
| 3,913,700 | 10/1975 | James . | |
| 4,248,330 | 2/1981 | Audiffred, Jr. et al. | 192/219 |
| 4,300,652 | 11/1981 | Redzinski et al. . | |
| 5,036,718 | 8/1991 | Bulgrien . | |
| 5,176,046 | 1/1993 | Fujiwara et al. . | |

FOREIGN PATENT DOCUMENTS

| | | |
|---|---|---|
| 114513 | 8/1984 | European Pat. Off. . |
| 477545 | 8/1991 | European Pat. Off. . |
| 617215 | 9/1994 | European Pat. Off. . |
| 2200958 | 8/1988 | United Kingdom . |

*Primary Examiner*—Khoi Q. Ta
*Attorney, Agent, or Firm*—MacMillan, Sobanski and Todd, LLC

[57] ABSTRACT

A vehicle powershuttle system comprising a conventional forward/reverse gearset with a synchromesh and an electronic control system arranged to automatically control the vehicle main clutch, main brake and forward/reverse synchromesh to effect a substantially smooth engagement of forward or reverse drive to the vehicle driving wheels on manual selection of forward or reverse gear.

8 Claims, 2 Drawing Sheets

AUTOMATIC FORWARD/REVERSE GEAR CHANGE SYSTEM HAVING A MAIN CLUTCH DISENGAGED AND MAIN VEHICLE BRAKE ENGAGED DURING A SHUTTLE SHIFT

BACKGROUND OF THE INVENTION

The present invention relates to a method and a system for automatically performing a forward/reverse gear change without requiring the manual disengagement of the vehicle main clutch. The invention has particular application in agricultural tractors where eg frequent three point turns on field headlands and repeated backward and forward travel during loading work involve frequent forward/reverse gear changes.

The concept of a system for effecting a direction change by shifting a lever or button, etc, without touching the clutch pedal is known. The word "powershuttle" is often used to describe such a system.

Known powershuttles generally employ two clutches working against each other to control the transfer of power between gear trains that remain continually in mesh. That is to say, no synchromesh is employed and the shift is effected using a similar procedure to that employed in making a shift between two forward gears in a "power shift" transmission. Thus, one clutch is arranged to transmit or to disable a reverse direction drive to the vehicle's driving wheels, whilst the other is arranged to transmit or disable a forward direction drive.

The control of the forward and reverse clutches will generally be electronic, taking into account speed, engine revs, and possibly other factors to set an optimum rate for the respective clutches to engage and disengage.

This type of system obviously requires a reverse direction clutch in addition to its main clutch.

The problem with such a powershuttle is that a great deal of energy needs to be dissipated by the clutches during a gear change, and the additional reverse clutch therefore needs to be substantial. This makes for high cost and the requirement for room under the bonnet to house the extra clutch.

The object of the present invention is to alleviate the above problems and provide a powershuttle system which is relatively inexpensive and requires no more room under the bonnet than is taken up by an equivalent transmission with a manual forward/reverse change.

A further object of the invention is to provide a powershuttle system that is readily installed in a vehicle with a conventional manual forward/reverse gearshift facility, with the minimum of adaptation; in particular, leaving the majority of the components in the transmission unaffected.

SUMMARY OF THE INVENTION

According to the invention, a powershuttle gear shift control system is provided for a vehicle having a main clutch, a main brake system and a synchromesh forward/reverse gearshift arrangement, the control system comprising:

(a) means for sensing the position of the forward/reverse synchromesh;

(b) manual selector means for selecting forward or reverse directions of travel, and (c) means for automatically controlling movement of the forward/reverse synchromesh, application of the main brake system and engagement of the main clutch in response to movement of the manual selector means, to cause a substantially smooth engagement of the forward or reverse drive to the driving wheels of the vehicle.

Preferably, the vehicle clutch pedal has priority over the gearshift control system to disengage the main clutch to a greater extent than that set by the gearshift control system at any time. Thereby, control is retained by the driver at all times to override the automatic operation of the clutch by the control system.

Preferably, also the vehicle main brake pedal(s) has priority over the gearshift control system to engage the main brake system to a greater degree than that set by the gearshift control system at any given time. Again, control is thereby retained by the driver at all times.

Preferably, the gearshift control system has means for sensing temperature and altering in accordance with the sensed temperature a control signal to an actuator for effecting movement of the main clutch and/or an actuator for effecting movement of the synchromesh. Thereby, the effects of temperature on the response speed of the actuator(s), which may be hydraulic, may be compensated for.

Preferably, the system further includes means for sensing the vehicle speed and/or engine speed. These parameters may thereby be taken into account by the control means in setting the rate and relative timing of the application of the main brake system engagement of the main clutch and/or movement of the synchromesh.

Optionally, the vehicle main clutch is a wet clutch. This type of clutch is better than an ordinary dry clutch at dissipating the large amounts of energy involved in making repeated direction changes.

DESCRIPTION OF THE PREFERRED EMBODIMENT

Figure 1:
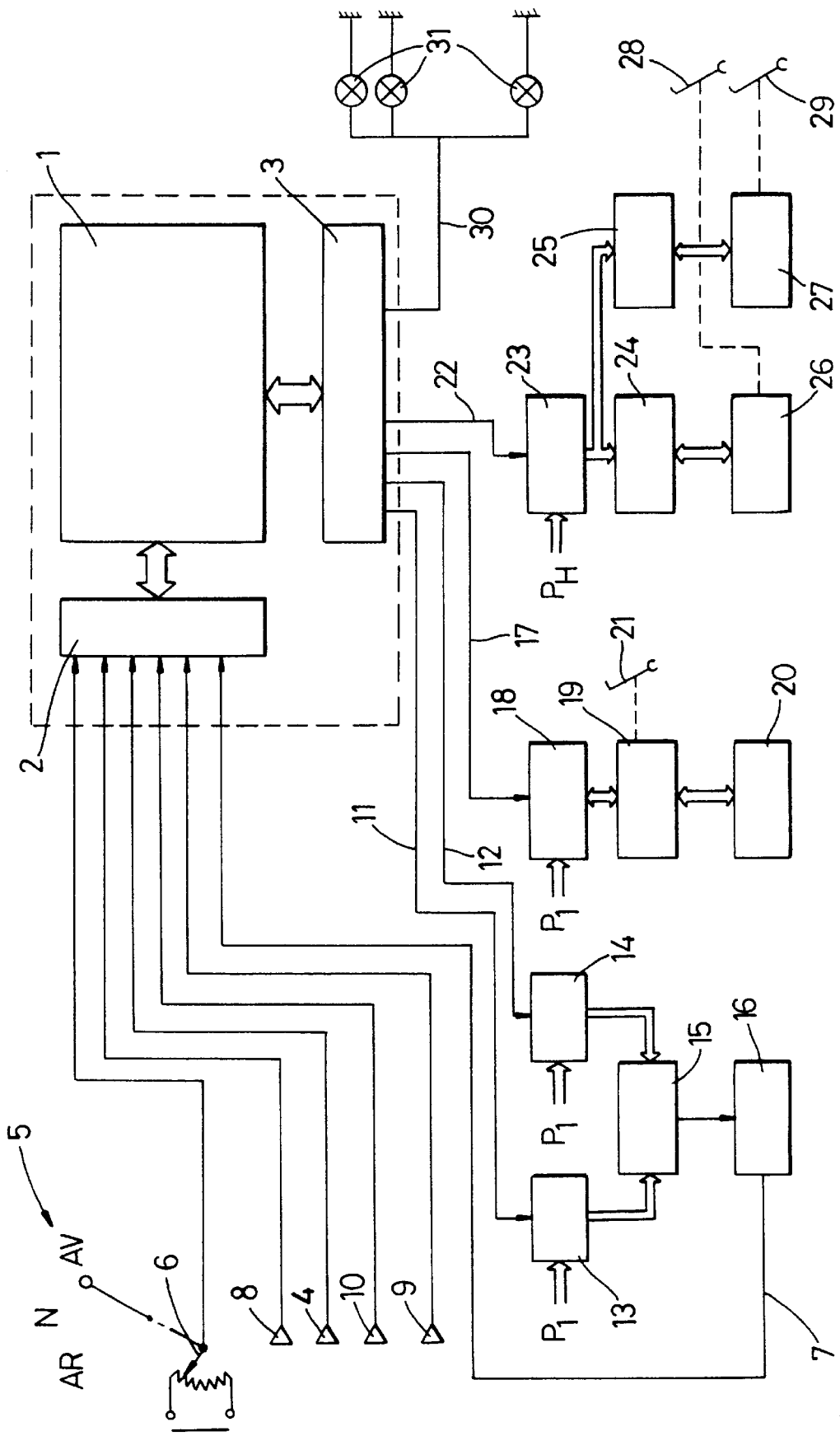
FIG. 1 is a block diagram schematically showing the components of a gearshift control system in accordance with the invention.

The system comprises a control unit 1, including a microprocessor, and having a number of inputs 2 and a number of outputs 3. The inputs to the system include an input from a potentiometer 6 indicating the position of the control lever 5 having forward (AV), reverse (AR) and neutral (N) positions.

Also connected into the control unit 1 are inputs from a vehicle speed sensor 8, engine speed sensor 4 and from a potentiometer 7 arranged to detect the position of the synchromesh 16 on the reversing gearset. In a modification of this embodiment, with total electronic clutch control, a potentiometer (not shown) is provided to sense the position of the main clutch pedal 21, connected via a line to the control unit 1.

In addition, there is a sensor 9 for detecting the temperature of oil in the main clutch (which is a wet clutch). The sensor 9 could alternatively detect the temperature of the oil anywhere in the transmission. Lastly, there is a sensor 10 positioned adjacent the main clutch (not shown) which detects when it is fully disengaged. A line from this sensor 10 is connected to an input on the control unit 1. This sensor 10 provides a security backup. The control unit 1 will not instruct movement of the synchromesh unless this sensor 10 indicates that the main clutch is fully disengaged.

The control unit 1 also includes outputs 3 to control the various functions involved in engagement of forward or reverse drive. These include outputs 11, 12 leading to respective forward 13 and reverse 14 valves controlling hydraulic supply to each side of a double acting hydraulic actuator 15 which governs movement of the synchromesh 16 in the reversing gearset.

An output 17 leads to an electrohydraulic valve 18 controlling the movement of the main clutch assembly 20 via a hydraulic connection to a further valve 19. There is also a hydraulic connection from the main clutch pedal 21 to the valve 19 controlling the supply of hydraulic fluid to the clutch assembly 20.

In the modification of this embodiment mentioned above, valves 18, 19 are replaced by a single electrohydraulic valve controlled via an electronic input from the control unit 1. Override by the clutch pedal is then provided via the control unit 1.

A further output 22 leads to a series of valves 23, 24, 25 controlling the supply of hydraulic fluid to the vehicle main brake system. Because this application is specifically for an agricultural tractor, there is, as is conventional in tractors, independent control of the left and right brakes 26, 27 via valves 24, 25 respectively, although the gearshift control system will in fact always operate the left and right sides simultaneously. The left 26 and right 27 brakes are also connected to left 28 and right 29 brake pedals in the tractor.

Finally, there are outputs, collectively shown as line 30 in the figure, to two dashboard display lights 31 and an audible alarm 31.

In operation, if the control lever 5 is moved, for example, from the forward position AV to the reverse position AR, this will initiate an automatic routine governed entirely by the control unit. There are a few possible alternative control strategies or regimes, but the simplest regime when a forward to reverse change is selected whilst the vehicle is travelling forwards is as follows.

The main clutch is first disengaged relatively suddenly and, simultaneously or a fraction of a second afterwards, the main brake is applied with the brake pressure being steadily ramped up over a period of time of perhaps a few seconds. The rate of increase of brake pressure in this time may alternatively follow a curve of some sort. After a given period of time, the vehicle speed is assumed to be zero, or alternatively sufficiently near zero for the synchromesh to be moved without a problem, eg 1–2 km/hr. Let us call this first phase of the regime Phase I. The brake is then released and simultaneously or a fraction of a second beforehand the synchromesh is moved. The main clutch begins to be applied simultaneously with release of brake pressure. The clutch pressure is gradually ramped up, or increased along a curve, to provide smooth start up in reverse direction. Let us call this "phase II" of the regime.

Figure 2A:
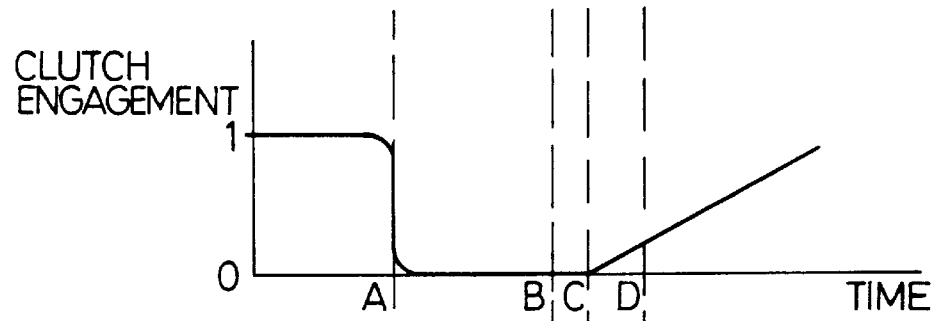
FIGS. 2a, 2b, 2c, 2d are series of plots showing various parameters against time during a gearshift.
Figure 2B:
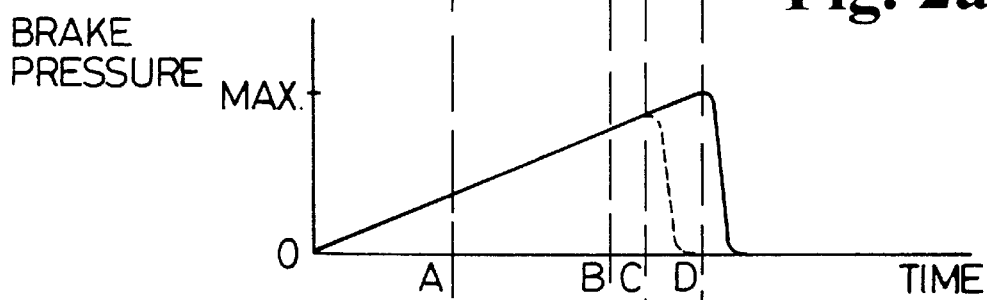
Figure 2C:
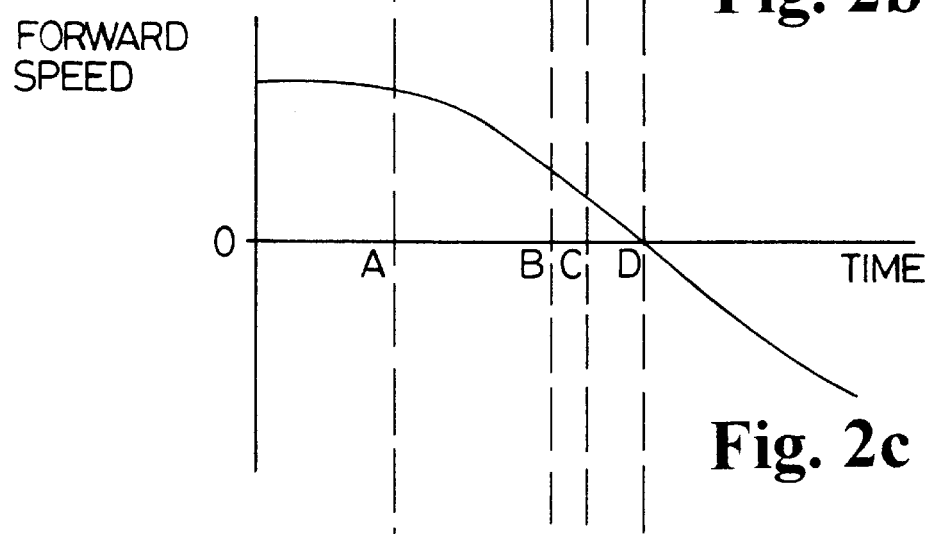
Figure 2D:
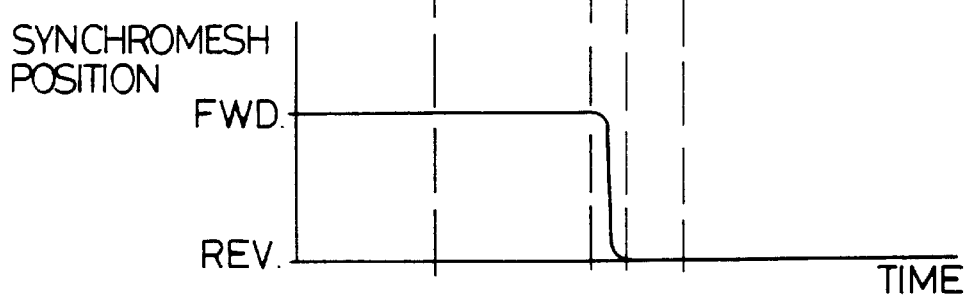

Referring now to FIGS. 2a to 2d, once a gear change from eg forward to reverse is selected, the clutch is relatively suddenly disengaged as shown as point A on FIG. 2a. As shown in FIG. 2b, the brakes are then gradually applied and, as shown in FIG. 2c, the vehicle forward speed gradually drops. At a point B, slightly before the vehicle reaches rest, movement of the synchromesh is initiated, which is completed by point C. At that point the clutch pressure is gradually increased from zero as shown in FIG. 2a, whilst the vehicle forward speed is still not completely reduced to zero.

A change from reverse to forward direction when the vehicle is moving in reverse would work in substantially the same way, as would a change either from forward to reverse or vice versa when the vehicle is stationary. A change into forward or reverse from neutral would also work in this way, whether the vehicle is stationary or moving.

A change into neutral requires simple, sudden disengagement of the clutch followed by sudden disengagement of the synchromesh.

The regime described above requires the control unit 1 to receive inputs only from the potentiometer 7 indicating the position of the synchromesh and from the control lever 5 indicating the desired direction of travel.

A more sophisticated regime, which is used in the present embodiment, is based on the simple regime described above, but with refinements as follows.

Instead of always ramping up the brake pressure over a set time period, the rate at which pressure is increased is determined by the control unit 1 as a function of vehicle speed as sensed by vehicle speed sensor 8 when the direction is selected using control lever 5. The control unit 1 will also not release the brakes until the sensor 8 indicates that the vehicle is stationary, or alternatively the speed has reached point C in FIG. 2 (which in the simplified system would have to be assumed to have happened after a given time). Similarly movement of the synchromesh can be initiated on detection of the forward speed reaching point B. If the sensor 8 indicates that vehicle speed is zero when the direction change is selected using lever 5, then the brake will not automatically be applied at all, and phase II of the regime commences straight away.

Phase II will not be commenced by the control unit 1 until the clutch full disengagement sensor 10 indicates that the clutch is fully disengaged. In Phase II, the rate at which the clutch pressure is increased is determined by the control unit 1 with regard to engine revs as sensed by engine speed sensor 4 and also sensed vehicle speed.

A more sophisticated control regime might involve continuous control of the clutch and/or brake pressure in a control loop linked to vehicle speed, such that the vehicle acceleration and deceleration exactly followed a pre-determined ideal curve, the characteristic of the curve also in itself being a function of vehicle speed and possibly direction at the moment the gearshift is selected.

The signal from the temperature sensor 9 is taken into account by the control unit 1 when setting the output signal commanding the clutch or synchromesh movement, since the hydraulic oil temperature will affect the response rate of the respective actuators.

The indicator lights 31 serve to indicate on the vehicle dashboard when a forward/reverse shift has been made and the fact that the vehicle is initiating this automatically. One light is provided for forward and one for reverse. An audible alarm also sounds when the control lever is moved to select a direction change; this alarm will cease to sound once the direction change is completed and the involvement of the automatic control has ceased. There may also be a different alarm tone if for some reason an automatic forward/reverse shift that has been selected has failed.

I claim:

1. A powershuttle gearshift control system for a vehicle having a main clutch, a main brake system and a synchromesh forward/reverse gearshift arrangement, the control system comprising:

(a) means for sensing the position of said forward/reverse synchromesh;

(b) manual selector means for selecting a forward or a reverse direction of travel of said vehicle, and (c) means for automatically controlling movement of said forward/reverse synchromesh, application of said main brake system and engagement of said main clutch in response to movement of said manual selector means, to cause a substantially smooth engagement of forward or reverse drive to one or more driving wheels of said vehicle.

2. A system as claimed in claim 1, wherein said clutch pedal has priority over said automatic control means to disengage said main clutch to a greater extent than that set by said automatic control means at any time.

3. A system as claimed in claim 1, wherein said vehicle main brake pedal(s) has priority over said automatic control means to engage said main brake system to a greater degree than that set by said automatic control means at any given time.

4. A system as claimed in claim 1 having means for sensing temperature and altering in accordance with the sensed temperature a control signal to an actuator for effecting movement of said main clutch.

5. A system as claimed in claim 1 having means for sensing temperature and altering in accordance with the sensed temperature a control signal to an actuator for effecting movement of said synchromesh.

6. A system as claimed in claim 1 further including means for sensing the vehicle speed and/or engine speed.

7. A vehicle including a system as claimed in claim 1.

8. A vehicle as claimed in claim 7, wherein the main clutch is a wet clutch.

* * * * *